(12) United States Patent
Fluhrer et al.

(10) Patent No.: US 8,746,646 B2
(45) Date of Patent: Jun. 10, 2014

(54) END CLAMP FOR FASTENING FRAMED PV MODULES

(75) Inventors: Dieter Fluhrer, Reichertsheim (DE); Hans Urban, Haag (DE)

(73) Assignee: Schletter GmbH, Kirchdorf (DE)

( * ) Notice: Subject to any disclaimer, the term of this patent is extended or adjusted under 35 U.S.C. 154(b) by 0 days.

(21) Appl. No.: 13/388,668

(22) PCT Filed: Aug. 3, 2010

(86) PCT No.: PCT/DE2010/000908
§ 371 (c)(1),
(2), (4) Date: Apr. 20, 2012

(87) PCT Pub. No.: WO2011/015186
PCT Pub. Date: Feb. 10, 2011

(65) Prior Publication Data
US 2012/0193310 A1 Aug. 2, 2012

(30) Foreign Application Priority Data
Aug. 3, 2009 (DE) .................... 20 2009 010 487 U (51) Int. Cl.
*A47B 97/00* (2006.01)
*B23Q 3/00* (2006.01)

(52) U.S. Cl.
USPC ........................................ 248/500; 269/307

(58) Field of Classification Search
USPC .............. 248/500, 510, 292.12; 211/94.01, 211/87.01; 269/307; 52/173.3
See application file for complete search history.

(56) References Cited

U.S. PATENT DOCUMENTS

| 1,281,531 | A | * | 10/1918 | Dietrich | 248/228.5 |
| 1,394,912 | A | * | 10/1921 | Korkosz | 269/59 |
| 1,781,085 | A | * | 11/1930 | Skinner | 248/48.1 |
| 4,328,728 | A | | 5/1982 | Ferdinand et al. | |
| 5,571,338 | A | * | 11/1996 | Kadonome et al. | 136/251 |
| 7,434,362 | B2 | * | 10/2008 | Liebendorfer | 52/173.3 |
| 7,621,487 | B2 | * | 11/2009 | Brown et al. | 248/65 |
| 8,209,914 | B2 | * | 7/2012 | Stearns et al. | 52/58 |
| 2003/0070368 | A1 | * | 4/2003 | Shingleton | 52/173.3 |
| 2006/0086382 | A1 | * | 4/2006 | Plaisted | 136/244 |

(Continued)

FOREIGN PATENT DOCUMENTS

| DE | 30 43 037 A1 | 11/1981 |
| DE | 20 2005 006 951 U1 | 8/2005 |

(Continued)

*Primary Examiner* — Jonathan Liu
*Assistant Examiner* — James Twomey
(74) *Attorney, Agent, or Firm* — Norman B. Thot (57) ABSTRACT

An end clamp for fastening a framed PV module on a carrier profile includes a first and second part with respective tooth systems corresponding to each other. The first and second parts together comprise a first section which holds down a frame of the framed PV module onto a surface of the carrier profile, a second section which laterally fixes the frame, a third section with an opening to have a screw pass therethrough, and a fourth section which supports the end clamp on the surface of the carrier profile. The first and second parts slide one inside the other parallel to the first and second sections in at least one discrete position corresponding to a specific frame height provided between the surface and the first section. The first and second parts thereby have one respective remaining degree of freedom and a clearance fit in two other degrees of freedom.

20 Claims, 4 Drawing Sheets

(56) References Cited

U.S. PATENT DOCUMENTS

| | | |
|---|---|---|
| 2007/0295391 A1* | 12/2007 | Lenox et al. ............... 136/251 |
| 2008/0010915 A1 | 1/2008 | Liebendorfer |
| 2009/0200443 A1 | 8/2009 | Burtscher et al. |
| 2009/0282755 A1* | 11/2009 | Abbott et al. ............... 52/173.3 |
| 2012/0009009 A1 | 1/2012 | Bub |

FOREIGN PATENT DOCUMENTS

| | | |
|---|---|---|
| DE | 20 2005 007 855 U1 | 8/2005 |
| DE | 10 2004 026 786 A1 | 12/2005 |
| DE | 10 2005 039 495 A1 | 3/2007 |
| DE | 10 2007 026 819 U1 | 12/2007 |
| DE | 10 2006 040 446 B3 | 1/2008 |
| DE | 20 2007 016 011 U1 | 5/2008 |
| DE | 20 2008 007 705 U1 | 9/2008 |
| DE | 20 2008 007 838 U1 | 9/2008 |
| DE | 10 2007 053 377 A1 | 5/2009 |
| DE | 20 2009 003 633 U1 | 6/2009 |
| EP | 2 090 847 A2 | 8/2009 |

* cited by examiner

END CLAMP FOR FASTENING FRAMED PV MODULES

CROSS REFERENCE TO PRIOR APPLICATIONS

This application is a U.S. National Phase application under 35 U.S.C. §371 of International Application No. PCT/DE2010/000908, filed on Aug. 3, 2010 and which claims benefit to German Patent Application No. 20 2009 010 487.7, filed on Aug. 3, 2009. The International Application was published in German on Feb. 10, 2011 as WO 2011/015186 A2 under PCT Article 21(2).

FIELD

The present invention relates to an end clamp for fastening framed PV modules on a carrier profile.

BACKGROUND

PV modules are customarily arranged grouped together into matrix-like module arrays and, for that purpose, securely clamped on parallel-mounted carrier profiles using so-called module clamps. As a rule, each PV module is held at its edges by means of four such module clamps. Module clamps in this context can generally be divided into two types, namely, center clamps and end clamps. Center clamps securely clamp the opposite edges of two adjacent PV modules jointly, whereas end clamps can only be used at the borders of the matrix-like module array, that is to say, hold only the outer edges of the outermost PV modules.

DE 20 2008 007 705 U1 describes a simple screwable end clamp for fastening framed PV modules on carrier profiles. The end clamp comprises a section for holding down the PV module or its frame and a section for laterally fixing the PV module or its frame, a central section with an opening for passing through a screw, and also a section by which the end clamp is supported on the carrier profile itself. In this arrangement, as is described, for example, in DE 20 2007 026 819 U1, the section for lateral fixing can also be higher than the section to for supporting the end clamp. Simple screwable end clamps of this type are arranged transversely on the carrier profiles such that a PV module can also be borne by the carrier profiles at statically favorable points, in particular at points with low deflection. A further characterizing feature is that, firstly, the section for supporting the end clamp comes to bear on the same continuous and mostly planar surface of the carrier profile on which the module frame also rests, and, secondly, is arranged exclusively on that side of the screw which is situated opposite to the section for lateral fixing.

Framed PV modules can have different module heights, to be more precise frame heights, depending on the manufacturer and type; these frequently range between 20 and 50 millimeters. Since end clamps, unlike center clamps, are supported on the carrier profile itself, a matching type of end clamp has to be used specifically for each frame height. With center clamps, by contrast, different frame heights are simply accommodated for by means of the screw fastening. An additional disadvantage is that, by virtue of their arrangement on the border of a matrix-like module array, end clamps are naturally required in much smaller unit numbers than center clamps.

DE 20 2005 007 855 U1 describes a further end clamp for mounting framed PV modules. This end clamp is arranged in parallel on an associated carrier profile, with it being a prerequisite that the carrier profile extends parallel to and exactly below the module borders, something which for practical and static considerations has not gained more widespread acceptance for framed PV modules.

DE 20 2005 006 951 U1 describes an end clamp which is likewise arranged in parallel on a special carrier profile and is additionally supported thereon in one of several parallel oblique grooves. Depending on the particular number and positioning of the oblique grooves, PV modules of different height can be fastened using this end clamp. However, this end clamp can only be used in combination with the special carrier profile. Moreover, by virtue of the system, the carrier profile must again be arranged in such a way that it extends parallel to and exactly below the module borders.

For unframed PV modules or so-called laminate modules, two-part end clamps are known, inter alia, from the catalog entitled "Modulklemmen Übersicht" ["Module clamp review"], as of May 2009, of Schletter GmbH under the designation "Serie_Profi". Laminate modules of different thicknesses can be clamped in between the two parts of the end clamp by means of a screw connection and simultaneously braced with the carrier profile. Unlike the initially mentioned, one-part end clamp, the lower part is supported on the carrier profile on both sides of the screw. Such end clamps are material-intensive when measured against the small adjustment range of approximately 3 to 14 millimeters and are not suitable for comparatively high framed PV modules.

SUMMARY

An aspect of the present invention is to provide an end clamp of the initially mentioned simple type that can be universally used for framed PV modules having a large number of different frame heights. An additional aspect of the present invention is to provide an end clamp which is suitable for the widest variety of carrier profiles and is easy to produce and assemble.

In an embodiment, the present invention provides an end clamp for fastening a framed PV module on a carrier profile includes a first part comprising a first tooth system with a plurality of tooth elements, and a second part comprising a second tooth system with at least one tooth element. The second tooth system is configured to correspond to the first tooth system. The first part and the second part together comprise a first section configured to hold down a frame of the framed PV module onto a surface of the carrier profile, a second section configured to laterally fix the frame, a third section with an opening configured to have a screw pass therethrough, and a fourth section configured to support the end clamp on the surface of the carrier profile. The fourth section is arranged on a side of the screw which is disposed opposite to the second section. The first part and the second part are configured to slide one inside the other parallel to the first section and the second section in at least one discrete position corresponding to a specific frame height provided between the surface and the first section. The first part and the second part thereby have one respective remaining degree of freedom and a clearance fit in two other degrees of freedom. The first tooth system with the plurality of tooth elements extends along the remaining degree of freedom.

BRIEF DESCRIPTION OF THE DRAWINGS

The present invention is described in greater detail below on the basis of embodiments and of the drawings in which.

DETAILED DESCRIPTION

The clamp can fasten a framed PV module on a carrier profile and comprises, as initially known from the prior art, substantially four functional sections: a section for holding down the frame of the PV module onto a surface of the carrier profile, a section for laterally fixing the frame, a section with an opening for passing through a screw, and a section for supporting the end clamp on the same surface of the carrier profile on which the frame also comes to bear. The section for supporting the end clamp is moreover arranged on one side and on that side of the screw which is situated opposite to the section for lateral fixing.

In an embodiment of the present invention, the end clamp comprises two parts which together contain the four sections and which can be assembled in a particular manner: the two parts can be slid one inside the other parallel to the sections for holding down and lateral holding and in several of possible discrete positions which correspond to specific frame heights provided between the surface and the section for holding down, each discrete position with one remaining degree of freedom and with a clearance fit in the other two degrees of freedom. To this end, provision is made for one of the parts to bear a tooth system having a plurality of tooth elements extending along the remaining degree of freedom and for the other part to bear a tooth system corresponding thereto and having at least one tooth element.

Owing to the fact that the two parts can be slid one inside the other in different positions while being offset in terms of height, the end clamp is universally suitable for framed PV modules having a large number of different frame heights. The tooth systems act not only as a sliding guide when the parts are being slid one inside the other but also, for setting the desired frame heights, as a retaining grid or mechanical index. In this respect, the at least one tooth element of one tooth system engages into the other tooth system or rather into the spaces between the tooth elements thereof.

The provision of a plurality of, for example, constantly spaced tooth elements makes it possible to achieve a very fine setting, for example, a setting incorporating more than 10 increments, such as millimeter increments. The desired frame height can moreover be set on site in a simple manner and, where appropriate, also be readjusted. This setting operation expediently takes place even before the end clamp is actually fastened, thereby contributing to worker safety particularly in the case of mounting on a roof.

In addition, such end clamps can be prefabricated at the factory and in series with a desired frame height or else with a frequently occurring frame height or, for ease of packaging, be preassembled with the smallest possible frame height. The end clamp is furthermore universally suitable for the widest variety of simple carrier profiles of the commercially available PV mounting systems, such as carrier profiles equipped with a central screw channel. In spite of its two-part form and its tooth systems, the end clamp can also be easily produced from a manufacturing point of view and, once set in the desired position, can be mounted exactly like a conventional simple end clamp.

The two parts can be slid fittingly one inside the other in any region of the end clamp, for example, in a region which is designed to be substantially perpendicular to one surface of the carrier profile. Provided for this purpose is, for example, a region of the section for supporting the end clamp or else a region in the section for lateral fixing. The section for supporting the end clamp offers advantages on account of its usually outwardly free installation space.

It is possible for one of the tooth systems to have only a single tooth element. This can be provided on the corresponding part in the form of a rib which extends along the remaining degree of freedom or in the sliding direction and engages into one of the spaces between the tooth elements of the other tooth system. Both tooth systems can, for example, each have a plurality of tooth elements extending along the remaining degree of freedom so that the engagement correspondingly takes place via a plurality of tooth elements. It is thereby possible to achieve better joining and strength properties for the connection between the two parts.

The two parts of the end clamp can, for example, be substantially embodied as extruded parts. Accordingly, these can be cut to length from an extruded profile, such as one made of light metal having the contour according to the present invention and be further processed, if required. The tooth systems can be extruded at the same time in a straightforward manner from a manufacturing point of view.

To allow the parts to be slid fittingly one inside the other with only one remaining degree of freedom, the tooth system of one part and the tooth system of the other part can engage behind one another, for example, in the manner of a dovetail joint or the like. In an embodiment of the present invention, provision can, for example, be made for one of the parts to enclose the other part in a U-shaped manner. The U-shaped enclosing part can thus have two spaced-apart legs by means of which the other part is correspondingly enclosed, for example, only partially. In this case, one leg can act as a complementary holder which prevents the possibility that tooth systems which are not provided with the ability to engage behind one another can disengage transversely with respect to the remaining degree of freedom. It is optionally nevertheless possible for the tooth systems to be able to engage behind one another, for example, in a mutual engagement involving only one flank per tooth element in each case. If one part encloses the other in a U-shaped manner, it may additionally be advantageous if the U-shaped enclosing part is that which is intended to bear on one surface of the carrier profile. In this arrangement, the two parts can then be slid fittingly one inside the other, particularly in the region of the section for supporting the end clamp.

In an embodiment of the present invention, a second tooth system can, for example, be provided on one of the parts and situated opposite inside or outside to the first tooth system thereof, wherein the first and the second tooth system are offset with respect to one another and one of the parts can also be fittingly slid together with the other part one inside the other in the same way, but in a turned-around position. By turning around one of the parts and then sliding it inside or pushing it together with the other part, a selection can be made from the mutually offset positions belonging to the first or second tooth system. A finer setting of the frame height is thereby possible or else the pitch spacing of the tooth elements can be greater for ease of manufacture, for example, for production by the extrusion process. That part with the first and second tooth systems can, for example, be the above-described U-shaped enclosing part, with the first and second tooth systems being situated opposite inside to one another. Alternatively, it is equally possible for the part which is enclosed in a U-shaped manner to be that part having the first and second tooth systems, with the first and second tooth systems then being situated opposite one another on the outside. In combination with tooth systems which only engage behind one another, i.e. without enclosing in a U-shaped manner, it is also conceivable for the first and second tooth systems to be provided on the outside of one of the parts. In any event, the first and the second tooth system can, for example, be offset by half an increment. As a result, the positions relating to one side with the first tooth system are ordered exactly centrally between the positions relating to the other side with the second tooth system.

In an embodiment, the tooth elements of at least one of the tooth systems can, for example, be constantly spaced apart and the pitch spacing thereof can correspond exactly to one length unit or two length units, for example, standardized units. In combination with tooth systems which are arranged offset by half a pitch spacing, it is possible that, when a pitch spacing of two length units is selected, the positions relating to one side with the first tooth system correspond in a practical manner to even-numbered length units, and the positions of the other sides with the second tooth system correspond in a practical manner to odd-numbered length units, for example, even-numbered and odd-numbered millimeters. With a pitch spacing of exactly one standardized length unit, one side can also correspond to whole length units and the other side can correspond to half length units. In any event, it may be expedient to design the respective tooth elements of all the tooth systems to have the same constant pitch spacing.

In an embodiment of the present invention, one of the parts can, for example, have a scale for the adjustable frame heights, and that frame height for which the two parts have been adjusted or are adjusted at the moment can be read off the scale using the other part or else a marking thereon. Such a scale can, for example, be a millimeter scale, although measuring systems having different length units are also possible in principle. In combination with the above-described tooth systems having an offset arrangement, this part, which can, for example, be the one other than the one having the first and second tooth systems, can have a second such scale on an opposite side. In that case, the first scale can, for example, correspond to the first tooth system and the second scale can, for example, corresponds to the second tooth system, with it being possible for the division lines of the scales to be offset in a corresponding manner to the tooth systems. It may also be advantageous in this context if the part other than that with the at least one scale has at least one joining instruction for selecting one of its two possible turning positions.

In an embodiment of the present invention, the end clamp can, for example, already be preassembled, for which purpose the two parts can be slid fittingly one inside the other in one of the possible discrete positions. For ease of packaging, the position can, for example, be that with the smallest provided frame height.

In an embodiment of the present invention, the end clamp can, for example, already be prefabricated for framed PV modules with a specific frame height, for which purpose the parts can be slid fittingly one inside the other in that position which corresponds closest to this frame height. Such a prefabrication operation can, for example, take place at the factory and in series. The prefabricated end clamp can thereby comprise a screw which is provided for bracing with a carrier profile and which has already been passed through the section with the opening. In addition, a nut element or another anchor element which is suitable for engaging behind a screw channel in the carrier profile can optionally be arranged on the shank of the screw. These measures can significantly facilitate the on-site assembly and contribute to worker safety, such as in the case of installations on a roof.

In order to cover a wide spread of frame heights, a set consisting of two end clamps can be provided. In such a set, one of the end clamps can, for example, be provided for greater frame heights than the other end clamp, wherein the smallest provided frame height of the end clamp for greater frame heights corresponds to the greatest provided frame height of the other end clamp or they overlap one another by up to six length units. For example, the end clamp for greater frame heights can start at 41 mm and the other end clamp for smaller frame heights can end at 41 mm or, in the case of an overlap, at 45 mm by way of example. However, because of a greater material saving, the provided frame heights of the two end clamps can be spaced apart by exactly one length unit such that, for example, one end clamp starts at 41 mm and the other ends at 40 mm. With a set of two end clamps according to the present invention, ones having tooth systems which are each arranged with an offset, it is possible, for example, for frame heights of between 28 and 53 mm to be covered in increments of 1 mm.

The particular length unit which is suitable with respect to the pitch spacing of the tooth systems, of the scales and/or of the above-described crossover between the two end clamps of a set is the millimeter, since it is standard practice internationally for frame heights of PV modules to be specified in millimeters.

The end clamp can, for example, be arranged together with a framed PV module, a carrier profile and a screw in such a way that the frame of the PV module rests on a surface of the carrier profile, wherein the frame crosses the carrier profile, and the PV module is fastened on the carrier profile by means of the end clamp, for which purpose the two parts of the end clamp are slid fittingly one inside the other in that position which corresponds closest to the height of the frame. Furthermore, the end clamp can be supported on said surface of the carrier profile by means of the section provided for that purpose, and the section for lateral fixing laterally fixes the frame in parallel, and the screw is passed through the section with the opening and braced with the carrier profile, and the section for holding down clamps the frame against said surface of the carrier profile.

Figure 1:
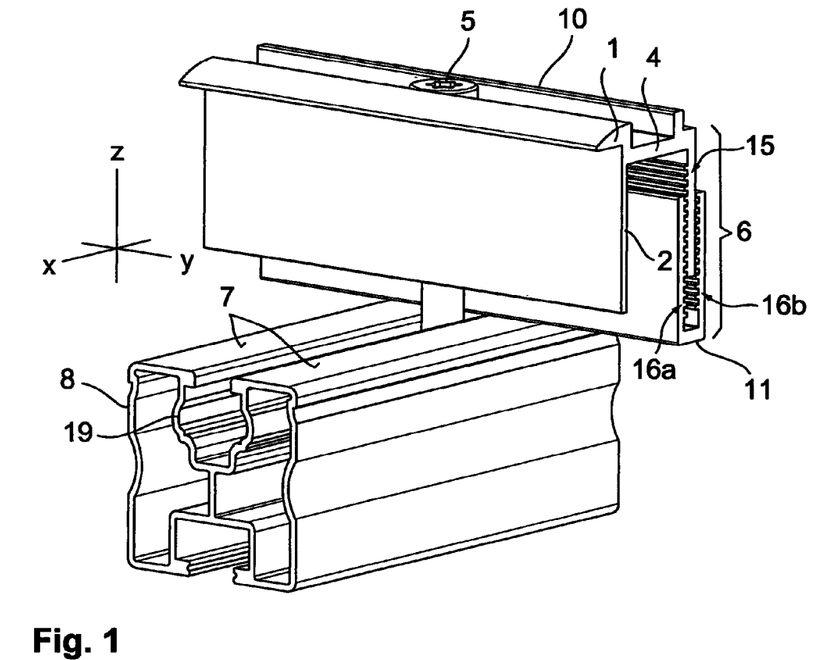
FIG. 1 shows a perspective view of an end clamp transversely mounted on a carrier profile.
Figure 2:
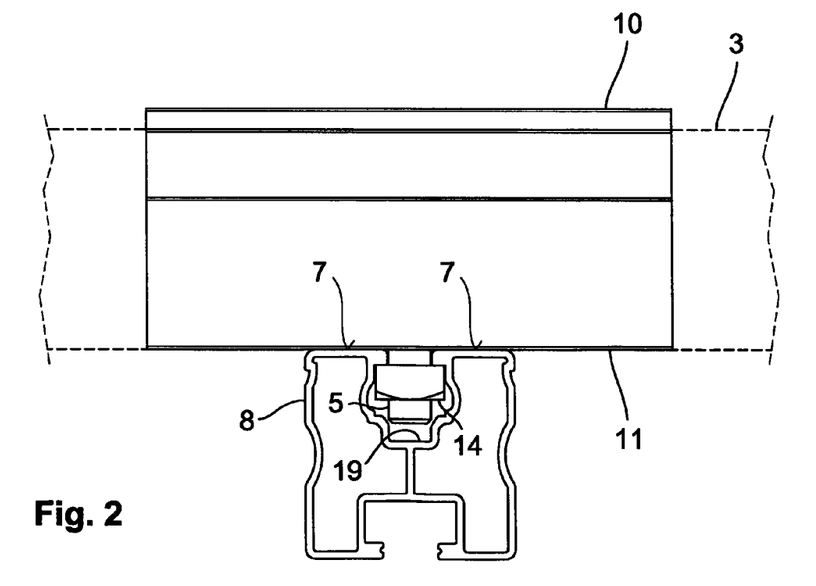
FIG. 2 shows a rear view of the assembly according to FIG. 1, additionally with a PV module.
Figure 3:
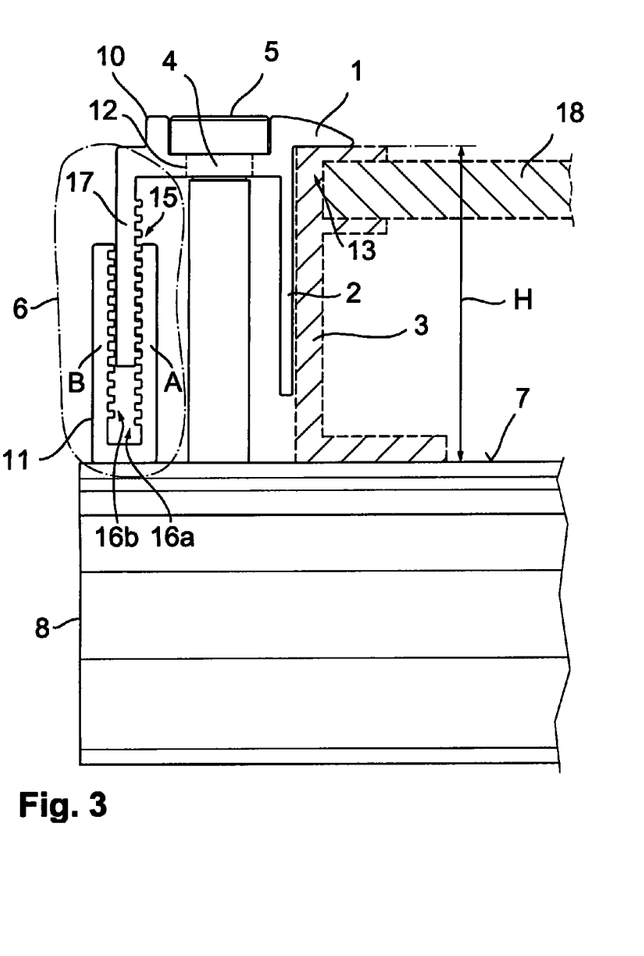
FIG. 3 shows a side view of the assembly according to FIG. 1 with the PV module according to FIG. 2.

The end clamp shown in FIG. 1 to FIG. 3 is provided for fastening a framed PV module on a carrier profile 8. The PV module of conventional design is only represented in FIG. 2 and FIG. 3 by way of dashed lines and can be recognized by its frame 3 and by a photovoltaic laminate 18 held therein. As can be seen, the PV module rests by its frame 3 on a continuous surface 7 of the carrier profile 8. The carrier profile 8 is embodied as an extruded profile and illustrated in truncated form in FIG. 1. In fact, it extends in the x-direction over and beyond a plurality of PV modules. In addition, to fasten the end clamp, the carrier profile 8 has a screw channel 19 which is open to the surface 7. This channel is embodied as an undercut longitudinal groove which divides the surface 7 into two halves. The frame 3, or rather this segment of the overall rectangular frame, crosses the carrier profile 8 in the y-direction, comparably with the arrangement illustrated in DE 20 2008 007 838 U1.

As known from the prior art, the end clamp comprises substantially four functional sections: a section 1 for holding down the frame 3 of the PV module onto the surface 7 of the carrier profile 8, a section 2 for laterally fixing the frame 3, a section 4 with an opening 12 for passing through a screw 5, and a section 6 for supporting the end clamp on the same surface 7 of the carrier profile 8 on which the frame 3 also comes to bear. Also typical of this simple type of end clamp is the fact that the section 6 for supporting the end clamp is arranged exclusively on one side and on that side of the screw 5 which is situated opposite to the section 2 for lateral fixing. It can also be seen that the end clamp has a longitudinal extent in the y-direction and is arranged such that the end clamp, such as its section 2 for lateral fixing, is directed transversely with respect to the carrier profile 8. In this arrangement, the end clamp, like the frame 3, crosses the carrier profile 8 approximately at a right angle. To clamp the end clamp, the screw 5, which engages with a square nut 14 inserted in the screw channel 19, is tightened to a suitable torque.

An innovation of the end clamp is that the end clamp consists of an upper part 10 and a lower, U-shaped part 11 having two parallel, spaced-apart legs A and B, that is to say is of two-part design. The two parts 10 and 11 together contain the four sections 1, 2, 4, 6. Here, the section 1 for holding down, the section 2 for lateral fixing and the section 4 for passing through the screw 5 are contained in the upper part 10, whereas the section 6 extends over both parts 10 and 11. Thus, a flange 17 which is parallel to the section 2 is provided on the upper part 10 and, together with the lower, U-shaped part 11, forms the section 6.

In the section 6 the two parts 10 and 11 can be slid one inside the other in the following manner: firstly, parallel to the sections 1 and 2 for holding down and lateral fixing, that is to say in the y-direction, which, with the end clamp mounted, is synonymous with parallel to the frame 3 or to its upper edge region 13; secondly, in several possible discrete positions which correspond to specific frame heights provided between the surface 7 and the section 1 for holding down, i.e. height-adjustably in the z-direction; and thirdly, in each of these positions, with a remaining degree of freedom, to be precise in the y- or sliding direction, and with a clearance fit in the other two degrees of freedom in the x- and z-directions. Provision is made for this purpose for the upper part 10 to bear, on the inner side of the flange 17 directed toward the screw 5, a tooth system 15 having a plurality of tooth elements extending along the remaining degree of freedom. The tooth elements can be seen as small, identical ribs and have a constant pitch spacing of 2 mm here. Furthermore, the lower, U-shaped part 11 also bears, on the inner side of the leg A, a tooth system 16a corresponding thereto and likewise having a plurality of tooth elements extending along the remaining degree of freedom. The two parts 10 and 11 are therefore guided linearly with respect to one another when they are slid one inside the other, which means that, apart from the clearance fit, only one degree of freedom, to be precise in the sliding direction, remains for each position. The parts are guided when they slide one inside the other by means of the mutually engaging tooth systems 15 and 16a and also by means of the lower part 11 which encloses the flange 17 in a U-shaped manner. The outer leg B thus additionally acts as a complementary holder for the flange 17, with the result that the tooth systems 15 and 16a cannot disengage parallel to the carrier profile 8. To set the desired frame height, the two parts 10 and 11 have been slid one inside the other in the corresponding position beforehand. This sliding of the parts one inside the other can take place either in one direction or in the other direction, that is to say from two sides. Furthermore, the lower U-shaped part 11 can be slid through completely along the upper part 11.

The position of the parts 10 and 11 that is shown by way of example in FIG. 3 corresponds to a frame height H of 42 mm. To set a different frame height, the two parts 10 and 11 can be slid apart again, moved to the corresponding position and slid one inside the other or pushed together again.

It can further be seen that the lower, U-shaped part 11 bears, on the inner side of the leg B, a second tooth system 16b which is situated opposite the first tooth system 16a thereof on the inside. The first and the second tooth system 16a and 16b are designed to be identical, for example, the tooth elements thereof have the same constant pitch spacing of 2 mm and the same tooth geometry, just like the tooth system 15. The second tooth system 16b is offset relative to the first tooth system 16a by exactly half a pitch spacing, i.e. by exactly 1 mm in the exemplary embodiment. The lower, U-shaped part 11 and the upper part 10 can be slid one inside the other not only in one direction and the other, but additionally in a reversed manner. That means that the lower, U-shaped part 11 can also be turned through 180° about a z-direction with respect to the upper part 10 and pushed onto the upper part 10 or its flange 17. As a result, it is then no longer the tooth system 16a on the leg A but the tooth system 16b on the leg B that engages with the tooth system 15 on the flange 17. In this way, it is possible, by means of the tooth system pairs 15/16a and 15/16b, for the parts 10 and 11 to be slid one inside the other in increments of 1 mm in each case in spite of the pitch spacing of 2 mm. On the one hand, the end clamp can therefore be produced in a straightforward manner from a manufacturing point of view and, on the other hand, can be set universally for PV modules having a large number of different frame heights in increments of 1 mm, with the tooth system pair 15/16a corresponding to even-numbered frame heights and the tooth system pair 15/16b corresponding to odd-numbered frame heights. In the present case, 6 positions are provided for even-numbered frame heights and 7 positions for odd-numbered frame heights.

Figure 4:
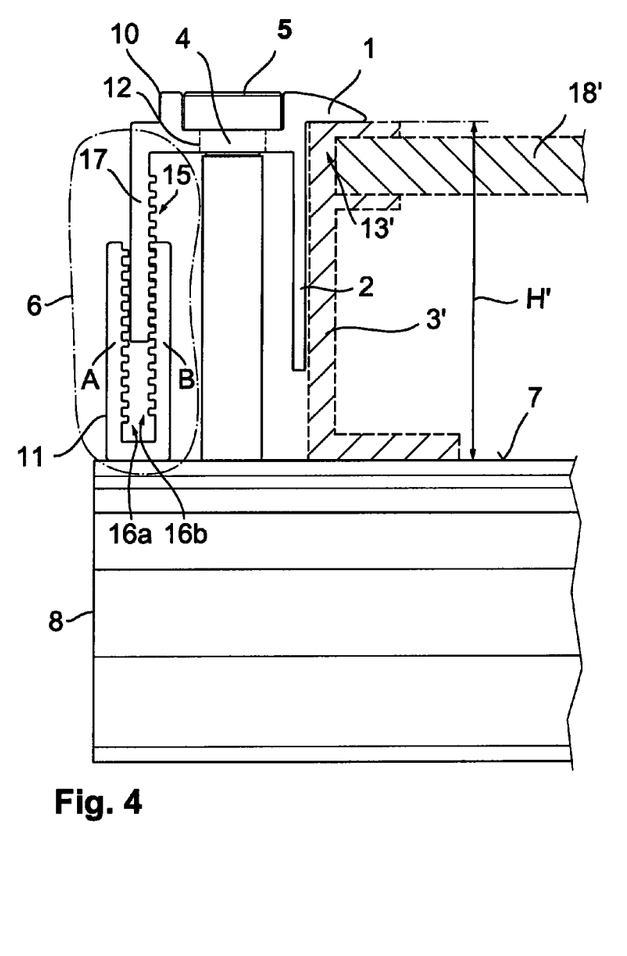
FIG. 4 shows a side view of the assembly according to FIG. 1 with a higher PV module.

To illustrate this variability, FIG. 4 shows the same end clamp set for a PV module with a greater frame height H' of 45 mm by way of example. For this purpose, the lower, U-shaped part II is turned around through 180° and pushed together with the upper part in the corresponding new position, which scenario can be seen from the reversed arrangement of legs A and B.

The two parts 10 and 11 of the end clamp according to FIG. 1 to FIG. 4, including their tooth systems 15, 16a and 16b, are each embodied substantially as extruded parts. The extrusion direction here corresponds to the remaining degree of freedom or the sliding direction. In such an extrusion process, the tooth elements of the tooth systems 15, 16a and 16b with a pitch spacing of 2 mm can be produced easily and with a high degree of strength.

What cannot be seen in greater detail is that the tooth systems 15 and 16a or 15 and 16b additionally engage behind one another to a slight extent at the tooth flanks, which are pressed against one another when tightening the screw 5. For this purpose, these tooth flanks are undercut obliquely, for example, continuously, to a minor degree and in a corresponding manner, with the result that the tooth systems are automatically drawn into the final engagement position on tightening the screw 5, as is disclosed in DE 20 2009 003 633 U1. By contrast, a clearance fit of about 2/10 mm is provided between the unloaded tooth flanks and also between the tooth-free outer side of the flange 17 and the particular tooth system 16*b* or 16*a* which is not being used. This allows the parts to slide one inside the other and provides that the connection is suitably strong.

Apart from the different setting and the 3 mm-higher frame 3', the arrangement according to FIG. 4 is identical to the arrangement according to FIG. 2 and FIG. 3. Once again, the frame 3' rests on the surface 7 of the carrier profile 8, with the frame 3' crossing the carrier profile 8. To fasten the PV module on the carrier profile 8, the two parts 10 and 11 of the end clamp have been slid fittingly one inside the other prior to being mounted in that position which corresponds closest to the height of the frame 3'. It is also intended that the end clamp is supported on said surface 7 of the carrier profile 8 by means of the section 6 provided for that purpose, and the section 2 for lateral fixing laterally fixes the frame 3' in parallel, and the screw 5 is passed through the opening 12 in the section 4 and is braced with the carrier profile 8 by means of the square nut 14 inserted in the screw channel 19, with the result that the section 1 for holding down clamps the frame 3' against said surface 7 of the carrier profile 8.

The two parts 10 and 11 of the end clamp according to FIG. 1 to FIG. 4 can be made available to the fitter as separate parts. However, it is also possible to prefabricate said parts for a specific frame height, in which case the two parts 10 and 11 have then been slid fittingly one inside the other in that position which corresponds closest to this frame height. In the case of such a prefabricated end clamp, the screw 5 can be combined therewith and be passed through the opening 12 already. It is additionally possible for the nut element 14 or any other anchor element, which is likewise suited to engaging behind a screw channel 19, to be arranged on the shank of the screw 5 already. In a simpler variant, the end clamp can also be preassembled without individual prefabrication merely in such a way that the parts 10 and 11 are slid one inside the other in a position which corresponds to the smallest possible frame height and thus allows the parts to be handled simply in terms of logistics and also to be packaged in a space-saving manner.

Figure 5:
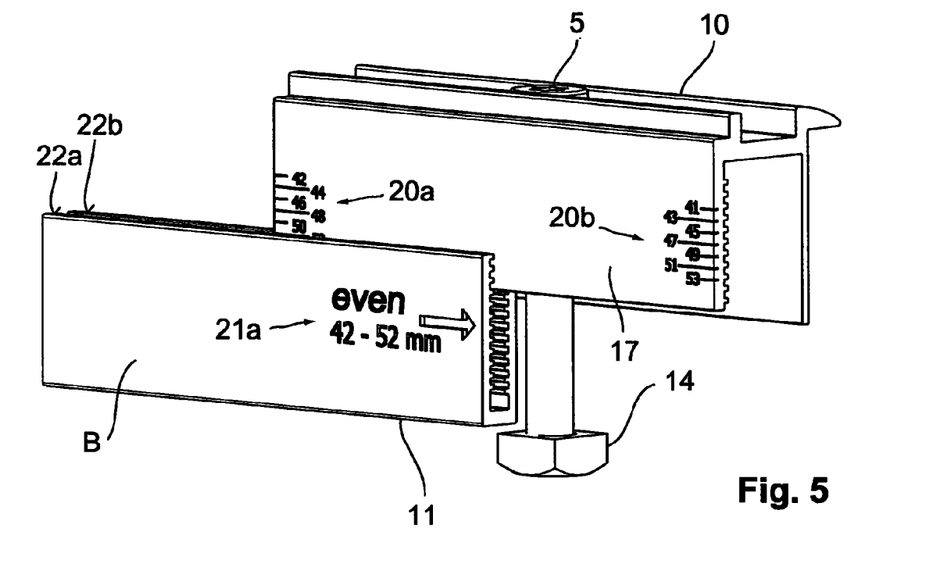
FIG. 5 shows a perspective view of the end clamp according to FIG. 1, additionally with scales.
Figure 6:
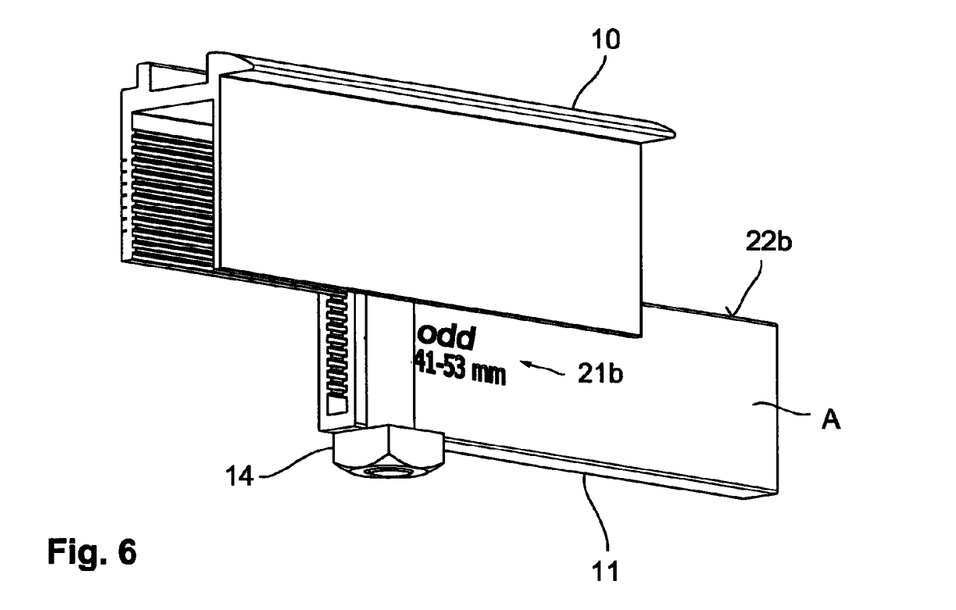
FIG. 6 shows a further perspective view of the end clamp according to FIG. 5.

FIG. 5 and FIG. 6 show the same end clamp according to FIG. 1 to FIG. 4, but without the carrier profile 8 and also while the parts are being slid one inside the other, and in another position. The end clamp is here supplemented by two scales 20*a* and 20*b* and also by two joining instructions 21*a* and 21*b*. The two scales 20*a* and 20*b* are provided for the adjustable frame heights and are arranged, for example, by laser engraving, on the upper part 10 on the tooth-free rear side of the flange 17. It can also be seen that the two scales 20*a* and 20*ba* are arranged, with respect to the remaining degree of freedom, on the opposite ends of the flange 17, i.e., each at the location where the lower, U-shaped part 11 is initially affixed to the upper part 10 for sliding one inside the other. That frame height for which the two parts 10 and 11 are set or become straight can be read off the respective scale 20*a* or 20*b* using the edge 22*a* or 22*b* of the lower, U-shaped part 11, with the scale 20*a* being associated with the tooth system pair 15/16*a*, i.e., even-numbered frame heights, and the scale 20*b* being associated with the tooth system pair 15/16*b*, i.e., odd-numbered frame heights. Accordingly, the division lines of the scales 20*a* and 20*b*, like the tooth systems 16*a* and 16*b*, are constantly spaced 2 mm apart and are offset with respect to one another by 1 mm and are also inscribed with the corresponding odd or even measuring numbers. For reading-off purposes, the edge 22*a* or 22*b*, when being viewed from above, then acts as a pointer for the scale 20*a* or 20*b*. The joining instructions 21*a* and 21*b* are arranged, for example, likewise by laser engraving, on the lower, U-shaped part 11, each on the outside of the leg A and B. They consist of an indication for the intended "42-52 mm" or "41-53 mm" setting range, an "even" or "odd" indication, and an arrow which indicates a joining direction for reading off the respective scale 20*a* or 20*b*. The assembly of the two parts 10 and 11 in connection with the two scales 20*a* and 20*b* and the joining instructions 21*a* and 21*b* is explained in more detail below with reference to a comparable end clamp illustrated in FIG. 7 to FIG. 9.

Figure 7:
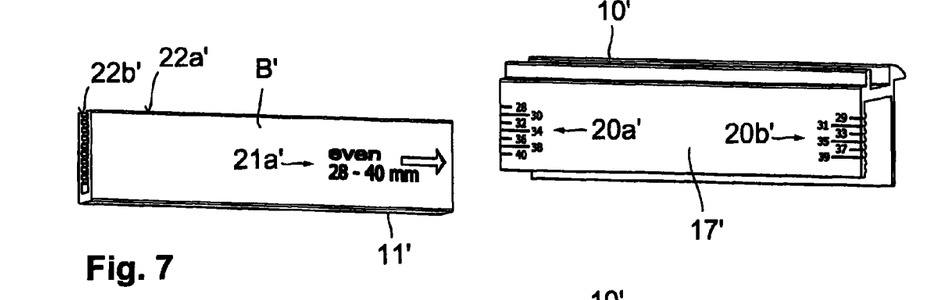
FIG. 7 shows a perspective view of the two separate parts of an end clamp, comparable with that according to FIG. 1, but for PV modules having smaller frame heights.
Figure 8:
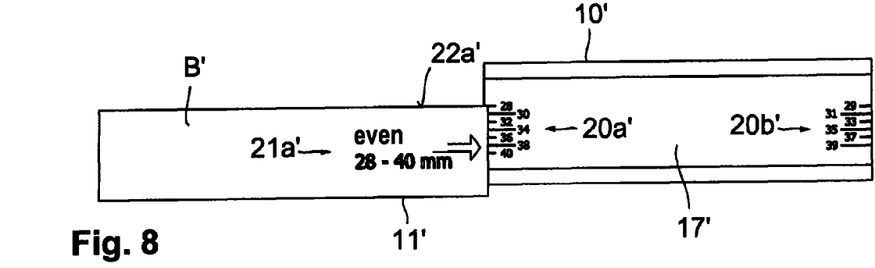
FIG. 8 shows a rear view of the parts according to FIG. 7 in an initial joining position for even-numbered frame heights.
Figure 9:
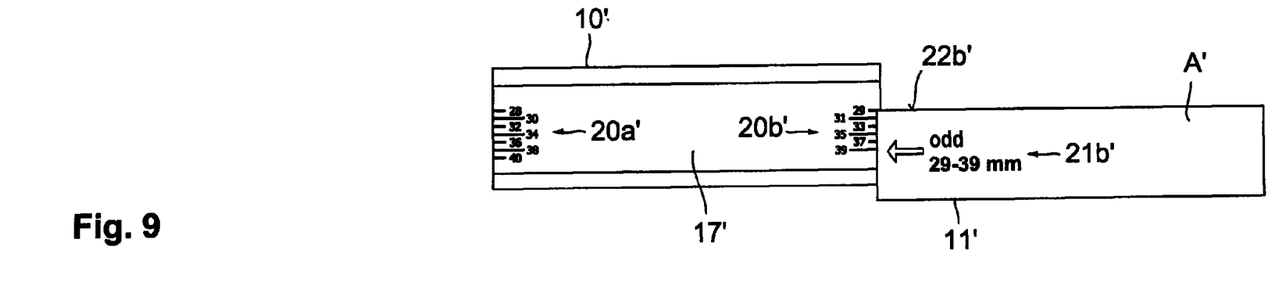
FIG. 9 shows a rear view of the parts according to FIG. 7 in an initial joining position for odd-numbered frame heights.

The end clamp illustrated in FIG. 7 to FIG. 9 is comparable with that shown in FIG. 5 and FIG. 6, but is intended for smaller frame heights. The end clamp has, just the same, an upper part 10' and a lower, U-shaped part 11'. Only the section for supporting the end clamp and the section for lateral fixing is correspondingly shorter. Furthermore, no screw has yet been passed through the section with the opening and the two parts 10' and 11' are initially separate according to FIG. 7.

As with the end clamp according to FIG. 5 and FIG. 6, two scales 20*a*' and 20*b*', each having a 2-mm division and offset with respect to one another by 1 mm, are again arranged on the upper part 10' on the tooth-free rear side of the flange 17'. That frame height for which the two parts 10' and 11' are set or become straight can again be read off the respective scale 20*a*' or 20*b*' using the edge 22*a*' or 22*b*' of the lower, U-shaped part 11'. Furthermore, two comparable joining instructions 21*a*' and 21*b*' are likewise provided, each on the outside of the leg A' and B' of the lower, U-shaped part 11'. The joining instructions 21*a*' and 21*b*' read, corresponding to the smaller setting range, "28-40 mm" and "29-39 mm", respectively, supplemented by the "even" or "odd" indication and an arrow which indicates a joining direction for reading off the relevant scale 20*a*' or 20*b*'.

For the purpose of expediently joining together or sliding the two parts 10' and 11' one inside the other, starting from the desired frame height, for example 28 mm according to FIG. 8, the lower, U-shaped part 11' should be positioned such that the "even" or "odd" indication which is appropriate for the desired frame height can be read. The leg B' is accordingly the front one of the two. The lower, U-shaped part 11', with the arrow leading, should then be guided up to the scale that relates to the frame height, that is to say in this case the scale 20*a*' having the value 28, with the front edge, i.e., the edge 22*a*', being made to coincide with the desired value 28 on the edge of the scale 20*a*', with the result that, finally, the parts can be slid one inside the other in the correct joining position until the lower part achieves congruence with the upper part 10'.

In order to set an odd-numbered frame height, for example, 29 mm according to FIG. 9, starting from the arrangement according to FIG. 8, the lower, U-shaped part 11' should initially be turned through 180° such that the word "odd" can be read, that is to say with the leg A' being the front one. Following the arrow of the joining instruction 21*b*', the lower, U-shaped part 11' should now be guided up to the scale 20*b*' and the value 29 should be selected using the edge 22*b*'. In this joining position, the two parts 10' and 11' can then be slid one inside the other.

It is possible in principle to use only one or else two more finely subdivided scales instead of two scales 20*a* and 20*b* having mutually offset division lines. With two mutually offset scales, however, readability is enhanced and it is made easier to select the correct side for pushing on the lower, U-shaped part 11'.

Finally, the end clamp according to FIG. 5 and the end clamp according to FIG. 7 can be assigned to one another as a set. The end clamp according to FIG. 5 is correspondingly provided for greater frame heights than the end clamp according to FIG. 7. The smallest provided frame height of 41 mm of the end clamp according to FIG. 5 follows the greatest provided frame height of 40 mm of the end clamp according to FIG. 7 with an interval of 1 mm. In this way, this set consisting of two end clamps can be used to cover frame heights between 28 and 53 mm in increments of 1 mm without a gap. The end clamps of a set, can for example, be uniformly supplied either with or without a screw. They can, for example, furthermore be uniformly supplied either with separate parts or with parts which have already been slid one inside the other.

The present invention is not limited to embodiments described herein; reference should be had to the appended claims

What is claimed is:

1. An end clamp for fastening a framed photovoltaic module on a carrier profile, the end clamp comprising:
    a first part comprising one flange with a first face having one first tooth system with a plurality of tooth elements and a second smooth face disposed opposite to the first face; and
    a second part comprising a second tooth system with at least one tooth element, the second tooth system being configured to correspond to the one first tooth system;
    the first part and the second part together comprising:
        a first section configured to hold down a frame of the framed photovoltaic module onto a surface of the carrier profile,
        a second section configured to laterally fix the frame,
        a third section with an opening configured to have a screw pass therethrough, and
        a fourth section configured to support the end clamp on the surface of the carrier profile, the fourth section being arranged on a side of the screw which is disposed opposite to the second section,
    wherein,
    the first face of the one flange with the one first tooth system is arranged to face the screw,
    the first part and the second part are configured to slide one inside the other parallel to the first section and the second section in at least one discrete position corresponding to a specific frame height provided between the surface and the first section, the first part and the second part thereby having one respective remaining degree of freedom and a clearance fit in two other degrees of freedom,
    the one first tooth system with the plurality of tooth elements extends along the remaining degree of freedom, and
    the one flange, the second section, and the third section of the first part are arranged in an inverted U-shaped manner.

2. The end clamp as recited in claim 1, wherein the first part and the second part are configured to slide one inside the other in a region of the second section or in a region of the fourth section.

3. The end clamp as recited in claim 1, wherein the one first tooth system and the second tooth system each have a plurality of tooth elements extending along the remaining degree of freedom.

4. The end clamp as recited in claim 1, wherein the first part and the second part are respectively provided as extruded parts.

5. The end clamp as recited in claim 1, wherein the first part and the second part are configured to slide one inside the other with only one respective remaining degree of freedom by at least one of the one first tooth system of the first part and the second tooth system of the second part being configured to engage behind one another, and the second part being configured to enclose the first part in a U-shaped manner.

6. The end clamp as recited in claim 5, wherein the U-shaped manner is provided as a U-shaped enclosing part, the U-shaped closing part being configured to bear on the surface of the carrier profile.

7. The end clamp as recited in claim 5, wherein the second part further comprises a third tooth system disposed opposite inside of or opposite outside of the second tooth system, the second tooth system and the third tooth system being offset with respect to one another, and the second part being configured to slide fittingly with the first part one inside the other in the same manner even in a turned-around position.

8. The end clamp as recited in claim 7, wherein the second part comprising the second tooth system and the third tooth system is the U-shaped enclosing part, and the second tooth system and the third tooth system are disposed inside the U-shaped enclosing part opposite to one another.

9. The end clamp as recited in claim 7, wherein the second tooth system and the third tooth system are arranged so as to be offset by half a pitch spacing.

10. The end clamp as recited in claim 7, wherein the third tooth system further comprises at least one tooth element, and the respective tooth elements of at least one of the one first tooth system, the second tooth system and the third tooth system is configured to be spaced constantly apart with a pitch spacing thereof corresponding exactly to a one length unit or a two length unit.

11. The end clamp as recited in claim 7, wherein one of the first part or the second part further comprises a first scale for an adjustable frame height, wherein a frame height to which at least one of the first part and the second part has been adjusted or is being adjusted can be read off the first scale using the other respective first part and second part or a respective marking thereon.

12. The end clamp as recited in claim 11, wherein the one of the first part or the second part with the first scale further comprises a second scale disposed opposite to the first scale.

13. The end clamp as recited in claim 11, wherein the first part or the second part not having the first scale further comprises at least one joining instruction for selecting one of its two possible turned-around positions.

14. The end clamp as recited in claim 1, wherein the end clamp is preassembled by fittingly sliding the first part and the second part one inside the other in a possible at least one discrete position.

15. The end clamp as recited in claim 14, wherein the at least one discrete position is that with a smallest provided frame height.

16. The end clamp as recited in claim 1, wherein the end clamp is prefabricated for the framed photovoltaic module with a specific frame height by fittingly sliding the first part and the second part one inside the other in the discrete position which corresponds closest to the specific frame height.

17. The end clamp as claimed in claim 1, wherein the end clamp further comprises a screw passed through the opening of the third section, the screw being configured to fasten with the carrier profile.

18. The end clamp as recited in claim 17, further comprising a screw channel disposed in the carrier profile and a nut element or an anchor element, wherein the nut element or the anchor element is arranged on a shank of the screw, and the nut element or the anchor element is configured to engage behind the screw channel in the carrier profile.

19. A set of two end clamps as recited in claim 1, wherein a first end clamp is provided for a larger frame height than a second end clamp, wherein a smallest provided frame height of the first end clamp for the larger frame height corresponds to a largest provided frame height of the second end clamp or the first end clamp and the second end clamp are spaced apart by exactly one length unit or overlap one another by up to six length units.

20. An arrangement comprising the end clamp as recited in claim 1, the framed photovoltaic module, the carrier profile and the screw, wherein,
- the frame of the framed photovoltaic module rests on the surface of the carrier profile,
- the frame crosses the carrier profile,
- the first part and the second part are slid fittingly one inside the other in a position which corresponds closest to a height of the frame so as to fasten the framed photovoltaic module on the carrier profile via the end clamp,
- the end clamp is supported on the surface of the carrier profile by the fourth section,
- the second section laterally fixes the frame in parallel,
- a screw is passed through the opening of the third section so as to be braced with the carrier profile, and
- the first section clamps the frame against the surface of the carrier profile.

* * * * *